APPARATUS FOR WELDING CIRCULAR JOINTS

Original Filed Dec. 15, 1964 2 Sheets-Sheet 1

APPARATUS FOR WELDING CIRCULAR JOINTS

Original Filed Dec. 15, 1964 2 Sheets-Sheet 2

United States Patent Office

Re. 26,800
Reissued Feb. 24, 1970

26,800

APPARATUS FOR WELDING CIRCULAR JOINTS

Karl Uno Jakobsson, Laxa, Sweden, by Elektriska Svetsningsaktiebolaget, Goteborg, Sweden, a corporation of Sweden, assignee Original No. 3,384,734, dated May 21, 1968, Ser. No. 418,439, Dec. 15, 1964. Application for reissue June 16, 1969, Ser. No. 838,718

*Claims priority, application Sweden, Dec. 21, 1963, 14,398/63*

Int. Cl. B23k *9/12*

U.S. Cl. 219—125 5 Claims

Matter enclosed in heavy brackets [ ] appears in the original patent but forms no part of this reissue specification; matter printed in italics indicates the additions made by reissue.

ABSTRACT OF THE DISCLOSURE

An apparatus for welding tubes to tube sheets by an arc-shielded metal arc welding process. The apparatus has a hand held substantially tubular head unit with a torch unit rotatably mounted on the other surface of the head unit. The head unit is supplied with a shielding gas and welding current through an extremity of the head unit. A motor including reduction gears is mounted on the head unit for rotating the torch unit. An electrode wire advancing mechanism is provided in the head unit for advancing the electrode wire to the torch unit.

This invention relates to apparatus for welding circular joints, particularly but not exclusively for welding tubes to tube sheets. More particularly, the invention relates to apparatus for welding circular joints of the type comprising a head unit, which does not rotate during the welding operation, and a torch unit rotatably attached to said head unit, said head unit being adapted to be connected to a source of welding current and a source of shielding gas through flexible conducting means and being provided with a motor with suitable reduction gear for rotating the torch unit.

The invention has for its general object to provide improved apparatus of this type. More particularly, it is an object of the invention to provide simple and light, easily handled apparatus which on completion of a weld can be removed easily and quickly to the next joint to be welded. A more special object is the provision of apparatus in which the transverse dimensions of the torch unit are small, so that the apparatus will be capable of welding joints which lie near a flange or a container wall. A further object is the provision of apparatus suitable for the welding of circular joints in a sheet or plate attainable from the open end of a comparatively deep chamber, of which it forms the bottom. Still another object is to provide an apparatus which is adaptable to the welding of circular joints having different radii.

The apparatus according to the invention comprises a head unit and a torch unit rotatably attached to said head unit, said head unit being adapted to be supplied with shielding gas and welding current through flexible conducting means and comprising, firstly, a motor with suitable reduction gear for rotating the torch unit, and, secondly, wire advancing mechanism for advancing the electrode wire to the torch unit, said torch unit comprising a substantially straight tubular body, the axis of which coincides with its axis of rotation with regard to the head unit, a concentric inner tube adapted to conduct the welding wire and the welding current, the annular space between the inner tube and the outer tubular body forming a shielding gas canal, centering member holding means attached to the outside of said tubular body, and a centering member journalled in said holding means and adapted to engage the work concentricaly to the joint to be welded.

Other features of the invention will be particularly pointed out in the appended claims and appear from the following description of the example of apparatus constructed in accordance with the present invention illustrated in the accompanying drawings, in which:

Figure 1:
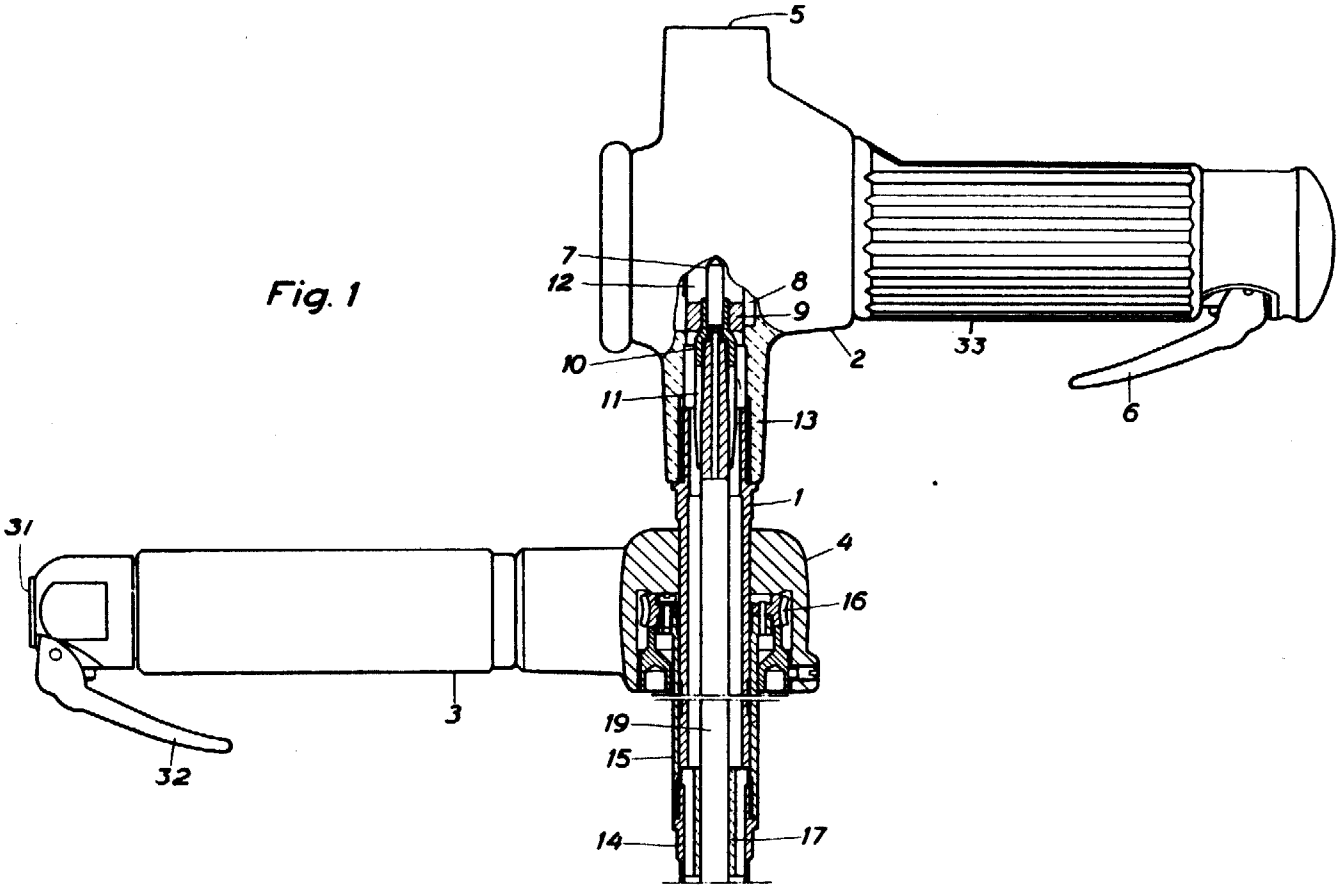
FIG. 1 is a side elevation of the upper part of the apparatus.
Figure 2:
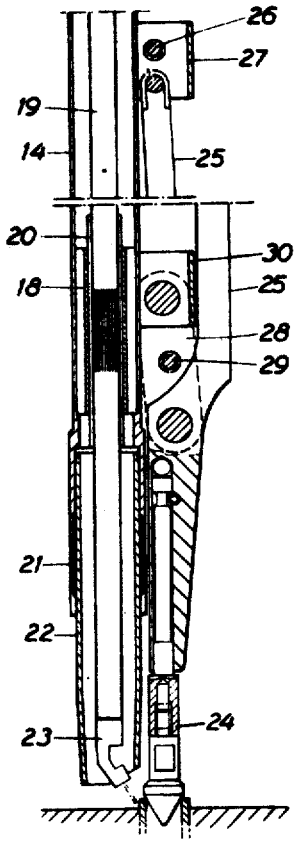
FIG. 2 is a side elevation of the lower part of the same apparatus.

The apparatus comprises a head unit and a torch unit. FIG. 1 shows the head unit and the upper extremity of the torch unit held therein, while FIG. 2 shows the rest of the torch unit.

The head unit has a tubular body 1 to which a wire advancing unit 2 and a rotator unit 3 are attached. The wire advancing unit is connected to the upper end of the tubular body through a screw-joint, while the rotator unit is fitted on to the outside of the tubular body 1 by means of a hood-sleeve 4. The rotator unit 3 has a sleeve-shaped housing serving as a handle. The wire advancing unit, the construction of which is shown and described in United States Patent No. 3,196,269 and forms no part of the present invention, is adapted to be connected at its posterior extremity 5 to a composite hose adapted to supply welding wire from a wire supply, shielding gas, welding current and compressed air for the operation of the compressed-air motor of the wire advancing unit. A trigger 6 on the handle 33 of the wire advancing unit acts on a valve in the compressed-air supply conduit of the motor. The welding wire is pushed into the guide tube 7 by the wire advancing mechanism (not shown). The welding current is conducted through the sleeves 8 and 9 to a contact sleeve 10 the lower part of which is slitted to form a number of contact springs 11. The shielding gas flows from the canal 12 of the advancing unit through holes (not shown) in the sleeve 9 into the connecting sleeve 13 of the wire advancing unit and the tubular body 1.

The torch unit has a straight tubular body 14 attached at its upper extremity to a sleeve 15. Sleeve 15 is rotatably mounted on tubular body 1. A worm-wheel 16 attached to the sleeve 15 engages a worm (not shown) journalled in the rotator unit 3 and operated through suitable gearing by a compressed-air motor provided in the rotator unit, which is adapted to be connected at 31 to a compressed-air hose. The trigger 32 operates a valve in the compressed-air supply conduit of the motor. Through the described arrangement, operation of the motor of the rotator unit 3 makes the sleeve 15 and the tube 14 rotate at an angular velocity adjusted to provide a suitable welding rate.

A guide tube 19 for the welding wire is fitted in the tube 14 by means of centering members 17, 18. The centering member 17 consists of electrically insulating material while the centering member 18, which consists of metal, is insulated from the guide tube by means of an insulating sleeve 20. The upper end of the guide tube is gripped by the contact springs 11, which transmit the welding current to the rotating guide tube during the welding operation. The inlet of the wire canal of the guide tube is adjacent to the lower extremity of the guide tube 7 of the head unit to facilitate the introduction of the welding wire into the guide tube 19. The lower extremity of the tube 14 is slitted to form a number of elastic tongues 21 slideably engaging a shielding gas nozzle 22. A contact tip 23 provided at the lower extremity of the guide tube has an inclined contact surface disposed in the path of the electrode wire emerging from the guide tube. Said contact surface serves to provide a reliable electric contact and a low contact resistance between the contact tip and the welding wire and also serves to bend the wire towards the tube to be welded so as to direct the tip of the wire towards the joint to be welded. The nozzle orifice is somewhat asymmetrical in order to provide an effective protection of the welding zone in spite of the eccentric position of the nozzle with regard to the welding zone.

To make the torch described the desired circular path relatively to the work, the torch unit is provided with a centering pin 24 carried by an arm 25. The pin is journalled in the arm so as to be freely rotatable about its own axis. The upper extremity of the arm is pivotally connected to a clamp 27 which is displaceable along the tube 14 and adapted to be secured in a selected position by means of the screw 26. The lower end of the arm is connected through links 28 with a second clamp 30 displaceable along the tube 14, a screw 29 being provided for securing the clamp in a selected position. With the aid of the clamps 27, 30 it is possible to set the torch to any desired radius of rotation (within the limit determined by the length of the links 28) and also to adjust the height of the torch with regard to the centering member and the work.

With the welding device described, welding operations can be carried out easily also on work surfaces enclosed within high flanges or container walls, as the length of the tube 14 can always be made sufficient to make the head unit remain above the edge of said flanges or walls. If desired, a set of two or more tubes 14 of different lengths, with torches and centering members fitted thereon, may be used, in order to permit the height of the torch unit to be chosen to conform to the workpiece in each particular case.

During the welding operation, the welding device should be held by the welder approximately at right angles to the surface of the plate or sheet to which the tubes are to be welded. Preferably said plate or sheet is kept in the horizontal position, in which case the welding device is to be held substantially vertical. Moderate deviations from the perpendicular or vertical position of the device are allowable, as they do not significantly modify the welding conditions and the position of the deposited welding head.

I claim:

1. Apparatus for welding circular joints, particularly for welding tubes to tube sheets, by the gas-shielded metal arc welding process, comprising a hand held substantially tubular head unit and a torch unit rotatably mounted on the outer surface of said head unit, said head unit being supplied with shielding gas and welding current through an extremity of said head unit, a motor mounted on said head unit, reduction gear for said motor rotating said torch unit, electrode wire advancing mechanism in said head unit for advancing the electrode wire to said torch unit, said torch unit having a substantially straight outer tubular body, the axis of said outer tubular body coinciding with its axis of rotation and with the axis of said tubular head unit, an inner tube concentric with said outer tubular body to conduct the welding wire and the welding current, an annular space between said inner tube and said outer tubular body, said annular space forming a shielding gas canal, centering member holding means attached to the outside of said outer tubular body and a centering member mounted for rotation in said holding means and engaging the open end of the tube concentrically to the joint to be welded.

2. Apparatus as described in claim 1, said head unit being provided with two handles for manually holding the apparatus in welding position, and a control member mounted on each of said handles, one of said control members starting and stopping the wire advancement and the other of said control members starting and stopping the rotary motion of said torch unit.

3. Apparatus as claimed in claim 1 in which the centering member holding means is adjustable laterally with regard to the torch unit.

4. Apparatus as claimed in claim 1 in which the centering member holding means is constituted by an arm hinged at one extremity to said outer tubular body while holding the centering means at the other extremity, means being provided to lock the arm in the desired angular position.

5. Apparatus as claimed in claim 1 comprising a contact tip carried by said inner tube at its lower extremity, said contact tip having an inclined contact surface disposed in the path of the electrode wire emerging from said inner tube deflecting the wire towards the centering member.

References Cited

The following references, cited by the Examiner, are of record in the patented file of this patent or the original patent.

UNITED STATES PATENTS

| | | | |
|---|---|---|---|
| 1,509,713 | 9/1924 | Noble | 219—125 |
| 1,809,653 | 6/1931 | Wagner et al. | 219—125 |
| 1,949,251 | 2/1934 | Gilbert | 219—125 |
| 2,900,487 | 8/1959 | Danhier | 219—126 |
| 2,938,994 | 5/1960 | Willigen et al. | 219—130 |
| 3,062,949 | 11/1962 | Lippert et al. | 219—125 |
| 3,114,830 | 12/1963 | Wotitzky et al. | 219—125 |
| 3,135,856 | 6/1964 | Stone | 219—125 |
| 3,207,408 | 9/1965 | Thome et al. | 219—125 |

JOSEPH V. TRUHE, Primary Examiner.

L. A. SCHUTZMAN, Assistant Examiner.

U.S. Cl. X.R.

219—60